(12) United States Patent  (10) Patent No.: US 7,914,091 B1
Joyce  (45) Date of Patent: Mar. 29, 2011

(54) FURNITURE SYSTEMS

(76) Inventor: Jared L. Joyce, Bozeman, MT (US)

( * ) Notice: Subject to any disclaimer, the term of this patent is extended or adjusted under 35 U.S.C. 154(b) by 550 days.

(21) Appl. No.: 11/635,467

(22) Filed: Dec. 5, 2006

Related U.S. Application Data

(63) Continuation-in-part of application No. 11/218,859, filed on Sep. 2, 2005, now Pat. No. 7,641,414.

(60) Provisional application No. 60/606,947, filed on Sep. 4, 2004, provisional application No. 60/714,059, filed on Sep. 1, 2005.

(51) Int. Cl.
    A47B 47/00 (2006.01)
(52) U.S. Cl. ............... 312/263; 312/257.1; 108/180; 108/193; 108/187; 108/188
(58) Field of Classification Search ............ 108/180, 108/193, 187, 188; 312/257.1, 263, 665.5; 248/676, 174, 903
    See application file for complete search history.

(56) References Cited

U.S. PATENT DOCUMENTS

| 291,032 | A |   | 1/1884  | Cleland |   |
|---|---|---|---|---|---|
| 348,252 | A |   | 8/1886  | Walsh |   |
| 471,697 | A |   | 3/1892  | Mosbacher |   |
| 706,763 | A |   | 8/1902  | Lange |   |
| 1,534,468 | A |   | 4/1925  | Shea, Jr. |   |
| 1,833,081 | A |   | 11/1931 | Kilmer |   |
| 1,954,242 | A | * | 4/1934  | Heppenstall | 403/381 |
| 2,072,383 | A | * | 3/1937  | Rottman | 312/263 |
| 2,279,864 | A |   | 4/1942  | Eide |   |
| 2,562,497 | A |   | 7/1951  | Klein |   |
| 3,021,187 | A |   | 2/1962  | Mitchell |   |
| 3,069,216 | A | * | 12/1962 | Vaeth | 312/195 |
| 3,379,483 | A |   | 4/1968  | Oldford |   |
| 3,549,019 | A |   | 12/1970 | Wood et al. |   |
| 3,612,289 | A |   | 10/1971 | Zink |   |
| 3,625,163 | A |   | 12/1971 | Grossman |   |
| 3,664,011 | A |   | 5/1972  | Labastrou |   |
| 3,784,273 | A |   | 1/1974  | Nikolai |   |
| 3,806,124 | A |   | 4/1974  | Ippen et al. |   |
| 3,885,675 | A |   | 5/1975  | Hultenby et al. |   |
| 4,044,448 | A |   | 8/1977  | Watanabe et al. |   |
| 4,105,716 | A |   | 8/1978  | Sakai et al. |   |
| 4,110,946 | A | * | 9/1978  | Louther, Jr. | 312/264 |
| 4,158,421 | A |   | 6/1979  | Chi |   |
| 4,596,195 | A |   | 6/1986  | Wenger |   |
| 4,651,651 | A |   | 3/1987  | Sheffer |   |
| 4,739,887 | A |   | 4/1988  | Beach |   |
| 4,750,794 | A | * | 6/1988  | Vegh | 312/263 |
| 4,782,972 | A |   | 11/1988 | Wenkman et al. |   |
| 4,832,421 | A | * | 5/1989  | Shoffner | 312/263 |
| 4,880,284 | A | * | 11/1989 | Dickson et al. | 312/263 |
| 4,890,437 | A | * | 1/1990  | Quaile | 52/690 |
| 4,937,993 | A |   | 7/1990  | Hitchins |   |
| 5,114,265 | A |   | 5/1992  | Grisley |   |
| 5,328,289 | A |   | 7/1994  | Fussler |   |
| 5,423,357 | A |   | 6/1995  | Szymanski |   |
| 5,441,337 | A | * | 8/1995  | Mazura et al. | 312/265.5 |
| 5,454,331 | A | * | 10/1995 | Green | 108/180 |
| 5,499,886 | A | * | 3/1996  | Short et al. | 403/381 |

(Continued)

*Primary Examiner* — Janet M Wilkens
*Assistant Examiner* — Dan Rohrhoff
(74) *Attorney, Agent, or Firm* — Robert M. Hunter

(57) ABSTRACT

Asymmetrical joint systems, structures having interlocking joints, methods of fabricating asymmetric joint systems and methods for fabricating structures having interlocking joints. In a preferred embodiment, the invention is a structure that incorporates a rotational diamond-shaped bracing system. In another preferred embodiment, the invention is a method of assembling such a structure.

9 Claims, 12 Drawing Sheets

U.S. PATENT DOCUMENTS

| | | | |
|---|---|---|---|
| 5,527,103 A * | 6/1996 | Pittman | 312/263 |
| 5,653,366 A | 8/1997 | Liserre | |
| 5,688,030 A | 11/1997 | McAnally et al. | |
| 5,803,561 A | 9/1998 | Puehlhorn | |
| 6,004,065 A | 12/1999 | Higdon et al. | |
| 6,126,022 A * | 10/2000 | Merkel | 211/135 |
| 6,127,019 A * | 10/2000 | Means | 428/120 |
| 6,164,477 A | 12/2000 | Druckman et al. | |
| 6,283,668 B1 | 9/2001 | Norek | |
| 6,325,568 B1 | 12/2001 | Druckman et al. | |
| 6,413,007 B1 | 7/2002 | Lambright | |
| 6,550,879 B1 * | 4/2003 | Kurrasch et al. | 312/257.1 |
| 6,637,608 B1 | 10/2003 | Schneider | |
| 6,675,979 B2 | 1/2004 | Taylor | |
| 6,726,397 B2 | 4/2004 | Kuehn et al. | |
| 7,210,416 B1 * | 5/2007 | Grigsby, Jr. | 108/165 |

* cited by examiner

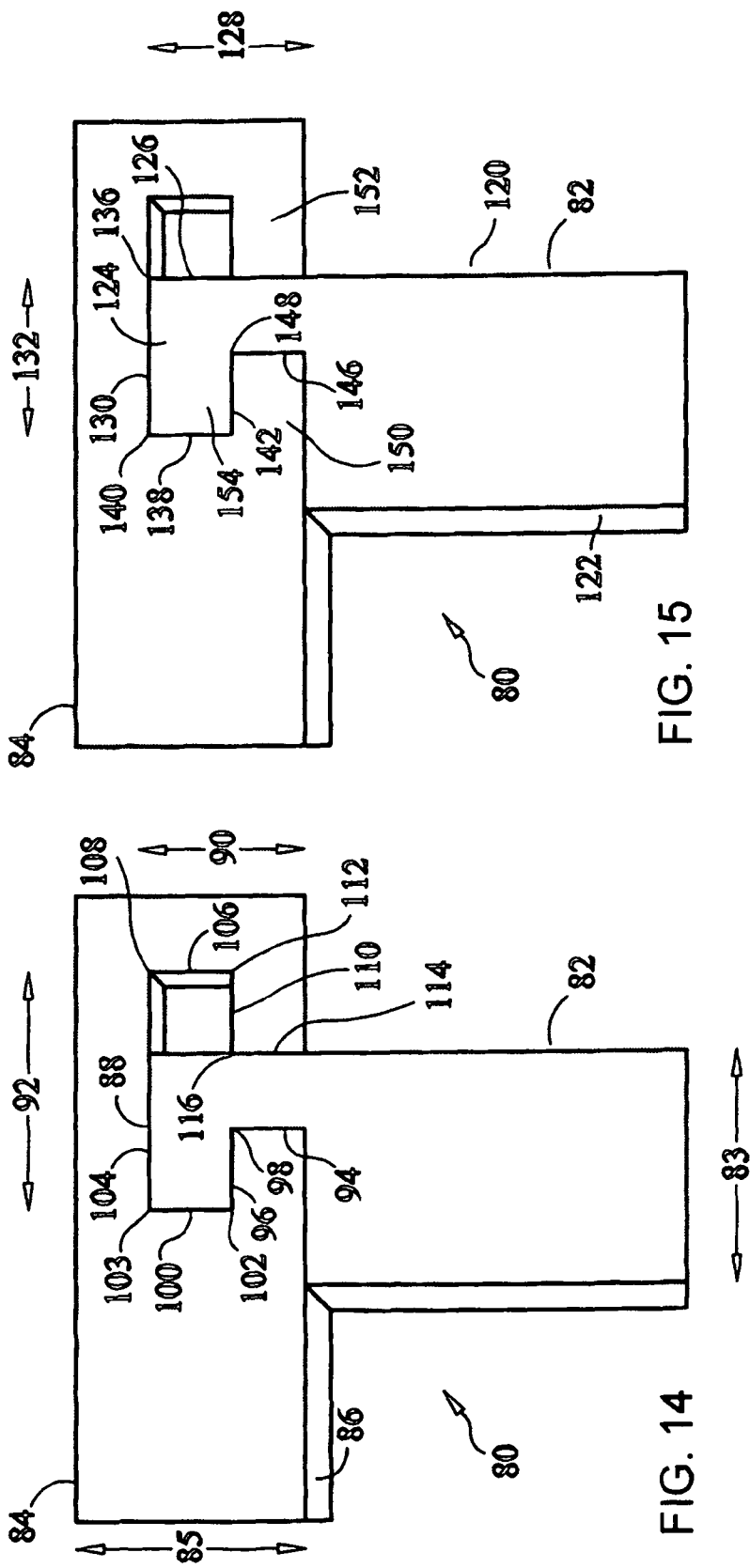

FURNITURE SYSTEMS

CROSS-REFERENCE TO RELATED APPLICATIONS

This application is a continuation-in-part of U.S. patent application Ser. No. 11/218,859, filed Sep. 2, 2005, which claims the benefit of U.S. Provisional Patent Application No. 60/606,947, filed Sep. 4, 2004, now expired, and U.S. Provisional Application No. 60/714,059, filed Sep. 1, 2005, now expired, the disclosures of which patent applications are incorporated by reference as if fully set forth herein.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

This invention relates to furniture systems and structures having interlocking joints. In particular, the invention relates to asymmetrical joint systems and furniture having interlocking components.

The background art is characterized by U.S. Pat. Nos. 291,032; 348,252; 471,697; 706,763; 1,534,468; 1,833,081; 2,279,864; 2,562,497; 3,021,187; 3,379,483; 3,549,019; 3,612,289; 3,625,163; 3,664,011; 3,784,273; 3,806,124; 3,885,675; 4,015,716; 4,044,448; 4,110,946; 4,158,421; 4,596,195; 4,651,651; 4,739,887; 4,750,794; 4,782,972; 4,937,993; 5,114,265; 5,328,289; 5,423,357; 5,499,886; 5,653,366; 5,688,030; 5,803,561; 6,004,065; 6,127,019; 6,164,477; 6,283,668; 6,325,568; 6,413,007; 6,637,608; 6,675,979 and 6,726,397; the disclosures of which patents are incorporated by reference as if fully set forth herein.

BRIEF SUMMARY OF THE INVENTION

The purpose of the invention is to provide joint systems and interlocking joints for quadrilaterals (four-sided structures) and other structures. One advantage is that conventional router bits can be used to construct the joint systems disclosed herein. Another advantage of the invention is that no tools are required to assemble the furniture kits disclosed herein.

The invention involves asymmetrical joints and other interlocking structural components and structures that incorporate them, including a rotational diamond back bookshelf. These inventions provide joint systems and structural components that can be incorporated into a variety of quadrilaterals and other structures.

In a preferred embodiment, the invention is a diamond-shaped bracing system, (e.g., for a quadrilateral, such as a bookshelf) that is capable of resisting lateral forces, said quadrilateral comprising: a frame (e.g., comprising a right side, a left side, a top plate and a bottom plate) having a left track, a right track and a groove; an upper backing piece having a first pair of backside tracks, said upper backing piece being slidably mountable in said left track, said right track and said groove; a middle backing piece having a second pair of backside tracks, said middle backing piece being slidably mountable in said left track and said right track and being interlockedable with said upper backing piece; a top left bracing piece that is slidably mountable in one of said first pair of backside tracks and in one of said second pair of backside tracks; a top right bracing piece that is slidably mountable in the other of said first pair of backside tracks and in the other of said second pair of backside tracks; a lower backing piece having a third pair of backside tracks, said lower backing piece being slidably mountable in said left track and said right track and being interlockedable with said middle backing piece; a bottom left bracing piece that is slidably mountable in one of said second pair of backside tracks and in one of said third pair of backside tracks; and a bottom right bracing piece that is slidably mountable in the other of said second pair of backside tracks and in the other of said third pair of backside tracks.

In yet another preferred embodiment, the invention is a joint system or interlocking structure for a quadrilateral, said joint system comprising: a bottom plate (e.g., first side) having two upper mortises in its upper surface and two lower mortises and a longitudinal groove on its bottom surface; a side kick left having a first front vertical groove, a first back vertical groove, a first horizontal groove and a first tenon that is slidably mountable in one of said lower mortises; a side kick right having a second front vertical groove, a second back vertical groove, a second horizontal groove and a second tenon that is slidably mountable in the other of said lower mortises; a front toe piece having a third horizontal groove, said front toe piece being slidably mountable in the first front vertical groove, the second front vertical groove and the longitudinal groove; a toe brace front piece that is slidably mountable in the first horizontal groove, the second horizontal groove and the third horizontal groove; a left (e.g., second) side having a left track, a left upper tenon and a left lower tenon that is slidably mountable (e.g., dovetailed) with one of said upper mortises; a right (e.g., second) side having a right track, a right upper tenon and a right lower tenon that is slidably mountable (e.g., dovetailed) with the other of said upper mortises; a top plate (e.g., fourth side) having a underside groove and two lower mortises that are slidably mountable (e.g., dovetailed) with the left upper tenon and the right upper tenon; an upper backing piece having a first pair of backside tracks, said upper backing piece being slidably mountable in said left track, said right track and said underside groove; an middle backing piece having a second pair of backside tracks, said middle backing piece being slidably mountable in said left track and said right track and being interlocked with said upper backing piece; a top left bracing piece that is slidably mountable in one of said first pair of backside tracks and in one of said second pair of backside tracks; a top right bracing piece that is slidably mountable in the other of said first pair of backside tracks and in the other of said second pair of backside tracks; a lower backing piece having a third pair of backside tracks, said lower backing piece being slidably mountable in said left track and said right track and being interlocked with said middle backing piece; a bottom left bracing piece that is slidably mountable in one of said second pair of backside tracks and in one of said third pair of backside tracks; a bottom right bracing piece that is slidably mountable in the other of said second pair of backside tracks and in the other of said third pair of backside tracks; a toe brace back piece that is slidably mountable the first vertical groove and the second vertical groove; a money piece having a horizontal track, said money piece being slidably mountable in the left back vertical groove and the right back vertical groove and being interlocked with said toe brace back piece, said lower backing piece, said bottom left bracing piece and said bottom right bracing piece.

In another preferred embodiment, the invention is a furniture system comprising: a top plate having two lower mortises; a left side having a left upper tenon that is slidably engageable with one of said upper mortises, a left cutout, a left ledge and a left side radial slot; a right side having a right upper tenon that is slidably engageable with the other of said upper mortises, a right cutout, a right ledge and a right side radial slot; a bottom plate having a left slot that is slideably ingageable with said left cutout and a right slot that is slidably engageable with said right cutout; a backing piece that is adapted to be rested on said left ledge and on said right ledge; and a rotational diamond component that is rotatably engageable with said left side radial slot and with said right side radial slot. Preferably, said left side has a left side first shelf mounting groove and said right side has a right side first shelf mounting groove; and said furniture system further comprises: a first shelve having ends that are slidably engagable with said left side first shelf mounting groove and with said right side first shelf mounting groove. Preferably, said left side has a first front vertical groove, a left back vertical groove and a left horizontal groove; said right side has a second front vertical groove, a right back vertical groove and a right horizontal groove; and said furniture system further comprises: a front toe kick that is slidably engageable with said first front vertical groove and with said second front vertical groove, said front toe kick having a third horizontal groove; a back toe kick that is slidably engageable with said left back vertical groove and with right back vertical groove, said back toe kick having a horizontal track; a toe brace front piece that is slidably engageable with said left horizontal groove, with said right horizontal groove and with said third horizontal groove; and a toe brace back piece that is slidably engageable with said left horizontal groove, with said right horizontal groove and with said horizontal track. Preferably, said top plate has a top plate underside radial slot; said bottom plate has a bottom plate topside radial slot; and said rotational diamond component is rotatably engageable with said top plate undersade radial slot and with said bottom plate topside radial slot radial slot.

In another preferred embodiment, the invention is a structure (e.g., a joint system for a quadrilateral) comprising: a top plate having an underside groove and two lower mortises; a bottom plate a longitudinal groove adjacent to its front edge and two bottom plate slots that extend part way through said bottom plate; a left side having a first front vertical groove, a first back vertical groove, a first horizontal groove, a left upper tenon that is slidably mountable in one of said lower mortises, and a left track; a right side having a second front vertical groove, a second back vertical groove, a second horizontal groove and a right upper tenon that is slidably mountable in the other of said lower mortises, and a right track; a front toe piece having a third horizontal groove, said front toe piece being slidably mountable in the first front vertical groove, the second front vertical groove and the longitudinal groove; a toe brace front piece that is slidably mountable in the first horizontal groove, the second horizontal groove and the third horizontal groove; a side left piece having at least one left horizontal groove, a left track, a left upper tenon and a left lower tenon that is slidably mountable (e.g., dovetailed) with one of said upper mortises; a side right piece having at least one right horizontal groove, a right track, a right upper tenon and a right lower tenon that is slidably mountable (e.g., dovetailed) with the other of said upper mortises; a top plate having a underside groove and two lower mortises that are slidably mountable (e.g., dovetailed) with the left upper tenon and the right upper tenon; at least one shelf that is slidably mountable in said left horizontal groove and in said right horizontal groove; an upper backing piece having a first pair of backside tracks, said upper backing piece being slidably mountable in said left track, said right track and said underside groove; an middle backing piece having a second pair of backside tracks, said middle backing piece being slidably mountable in said left track and said right track and being interlocked with said upper backing piece; a top left bracing piece that is slidably mountable in one of said first pair of backside tracks and in one of said second pair of backside tracks; a top right bracing piece that is slidably mountable in the other of said first pair of backside tracks and in the other of said second pair of backside tracks; a lower backing piece having a third pair of backside tracks, said lower backing piece being slidably mountable in said left track and said right track and being interlocked with said middle backing piece; a bottom left bracing piece that is slidably mountable in one of said second pair of backside tracks and in one of said third pair of backside tracks; a bottom right bracing piece that is slidably mountable in the other of said second pair of backside tracks and in the other of said third pair of backside tracks; a toe brace back piece that is slidably mountable in the first vertical groove and the second vertical groove; and a back toe piece having a horizontal track, said back toe piece being slidably mountable in the left back vertical groove and the right back vertical groove and being interlocked with said toe brace back piece, said lower backing piece, said bottom left bracing piece and said bottom right bracing piece. Preferably, each lower mortise and associated upper tenon comprise an interlocking flange joint system disclosed herein. Preferably, each lower mortise and associated upper tenon comprise an interlocking flange joint system disclosed herein.

In another embodiment, the invention is a method for making one or more of the components of one of the structures disclosed herein. In another embodiment, the invention is a method for assembling one of the structures disclosed herein.

Further aspects of the invention will become apparent from consideration of the drawings and the ensuing description of preferred embodiments of the invention. A person skilled in the art will realize that other embodiments of the invention are possible and that the details of the invention can be modified in a number of respects, all without departing from the concept. Thus, the following drawings and descriptions are to be regarded as illustrative in nature and not restrictive.

BRIEF DESCRIPTION OF THE SEVERAL VIEWS OF THE DRAWINGS

The features of the invention will be better understood by reference to the accompanying drawings which illustrate presently preferred embodiments of the invention. In the drawings:

FIG. 14 is a perspective view of the tenon portion of a preferred embodiment of the flange joint system of the present invention, shown assembled with the mortise portion for clarity.

FIG. 15 is a perspective view of mortise portion of a preferred embodiment of the flush joint system of the present invention, shown assembled with the tenon portion for clarity.

Figure 1:
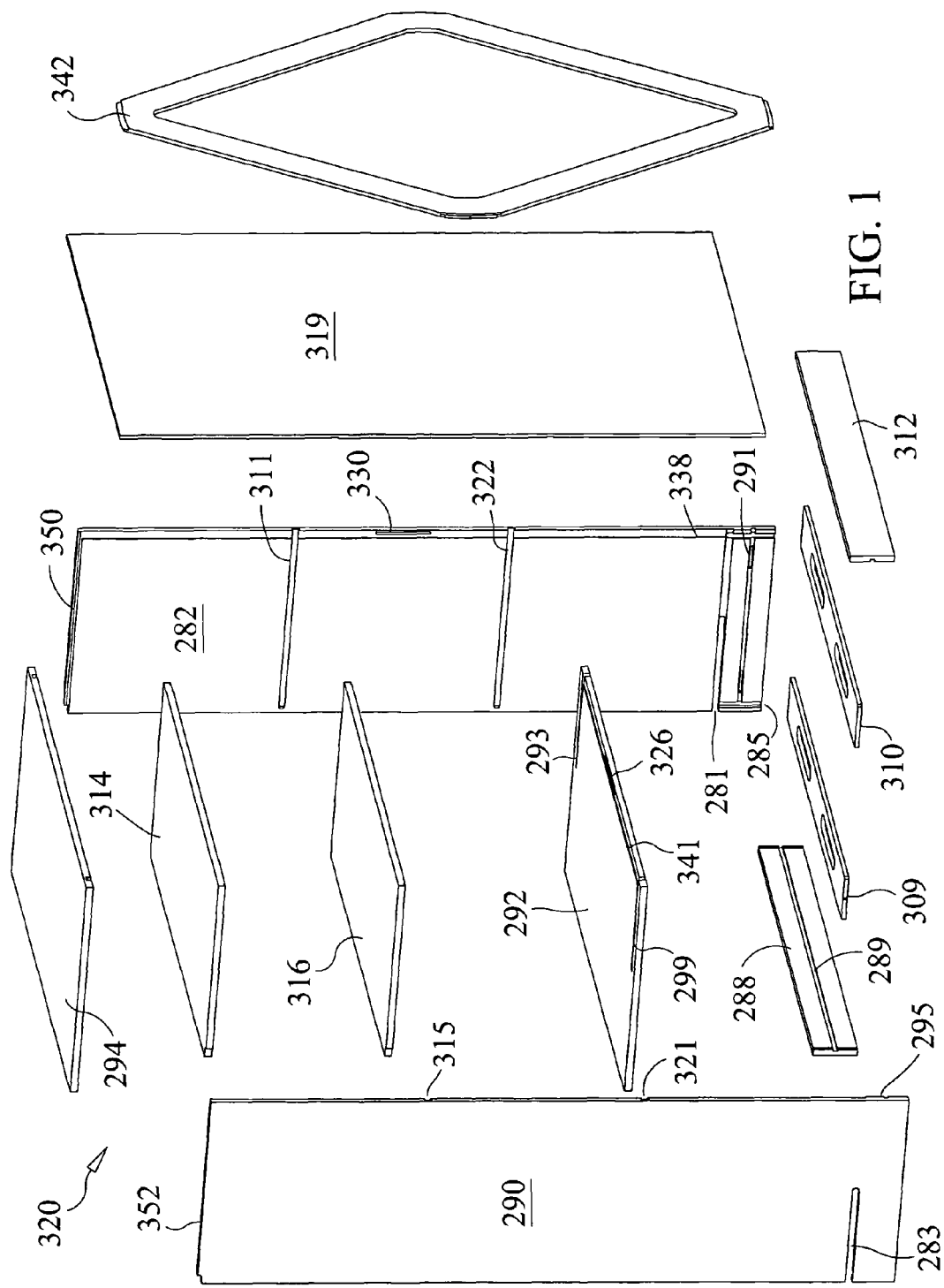
FIG. 1 is an exploded view of a preferred embodiment of a bookcase that incorporates aspects of the invention.

10 shelf joint system
12 support member
13 support member thickness
14 shelf member
15 shelf member thickness
16 support outer surface
18 mortise, first asymmetrical mortise, second asymmetrical mortise
20 mortise full depth
21 mortise full width
22 first mortise-forming surface
24 second mortise-forming surface
26 first mortise corner
28 third mortise-forming surface
30 second mortise corner
32 fourth mortise-forming surface
34 third mortise corner
36 fifth mortise-forming surface
38 fourth mortise corner
40 first shelf outer surface
42 second shelf outer surface
44 tenon
47 first tenon surface
46 tenon full depth
48 tenon full width
50 second tenon surface
52 first tenon corner
54 third tenon surface
56 second tenon corner
58 fourth tenon surface
60 third tenon corner
62 fifth tenon surface
64 fourth tenon corner
66 other overhanging edge, first cantilever, right cantilever, left cantilever
68 second cantilever, shelf cantilever
80 flange joint system
82 vertical member
83 vertical member thickness
84 flange member
85 flange member thickness
86 flange outer surface
88 flange mortise
90 full flange mortise depth
92 full flange mortise width
94 first flange mortise-forming surface
96 second flange mortise-forming surface
98 first flange mortise corner
100 third flange mortise-forming surface
102 second flange mortise corner
103 third flange mortis corner
104 fourth flange mortise-forming surface
106 fifth flange mortise-forming surface
108 fourth flange mortise corner
110 sixth flange mortise-forming surface
112 fifth flange mortise corner
114 seventh flange mortise-forming surface
116 sixth flange mortise corner
120 first vertical support outer surface
122 second vertical support outer surface
124 vertical tenon
126 first vertical tenon surface
128 full vertical tenon depth
130 second vertical tenon surface
132 full vertical tenon width
136 first vertical tenon corner
138 third vertical tenon surface
140 second vertical tenon corner
142 fourth vertical tenon surface
144 third vertical tenon corner
146 fifth vertical tenon surface
148 fourth vertical tenon corner
150 first flange mortise cantilever
152 second flange mortise cantilever
154 vertical tenon cantilever
280 quadrilateral, bookshelf
281 left side cutout
282 left side
283 right side cutout
284 second front vertical groove
285 first front vertical groove
287 first back vertical groove, left back vertical groove
288 front toe kick
289 third horizontal groove
290 right side
291 first horizontal groove, left horizontal groove
292 bottom plate
293 bottom plate left slot
294 top plate
295 second horizontal groove, right horizontal groove
296 upper backing piece
297 second back vertical groove, right back vertical groove
298 middle backing piece
299 bottom plate right slot
300 top left bracing piece
301 underside indents
302 top right bracing piece
304 lower backing piece
306 bottom left bracing piece
307 top plate ledge
308 bottom right bracing piece
309 toe brace front piece
310 toe brace back piece
311 left first shelf mounting groove
312 back toe kick
313 horizontal track
314 first shelf
315 right first shelf mounting groove 316 second shelf
317 indents
318 protrusions
319 backing piece
320 basic frame
321 right second shelf mounting groove
322 left second shelf mounting groove
323 left track
326 bottom plate topside radial slot
328 top plate underside radial slot
330 left side radial slot
332 right side radial slot
338 left side ledge
340 right side ledge
341 bottom plate ledge
342 rotational diamond component
350 left side upper tenon
352 right side upper tenon
354 left side lower mortise
356 right side lower mortise
358 first shelf back side
360 divots

DETAILED DESCRIPTION OF THE INVENTION

A number of preferred embodiments of the invention are described herein. While these embodiments are illustrated preferred joint components as being bounded by planar surfaces and to have right-angle corners, preferred joint components in other embodiments are bounded by curved surfaces and/or other non-planar surfaces and/or have rounded corners and have corners that are not right angle corners. A person having ordinary skill in the art would realize that the only requirement is that each tenon must fit in each associated mortise. Thus, the embodiments presented herein should be regarded as illustrative only.

Preferred embodiments of the invention include structures that incorporate one or more of the interlocking structures disclosed herein. Referring to FIGS. 1-6, a preferred embodiment of a bookcase that incorporates aspects of the invention is presented. In this embodiment, the invention is a quadrilateral (four-sided object) that is capable of resisting lateral forces. Quadrilateral or frame 280 comprises left side 282; front toe kick 288; toe brace front piece 309; right side 290; bottom plate 292; top plate 294; toe brace back piece 310 and back toe kick 312.

Figure 2:
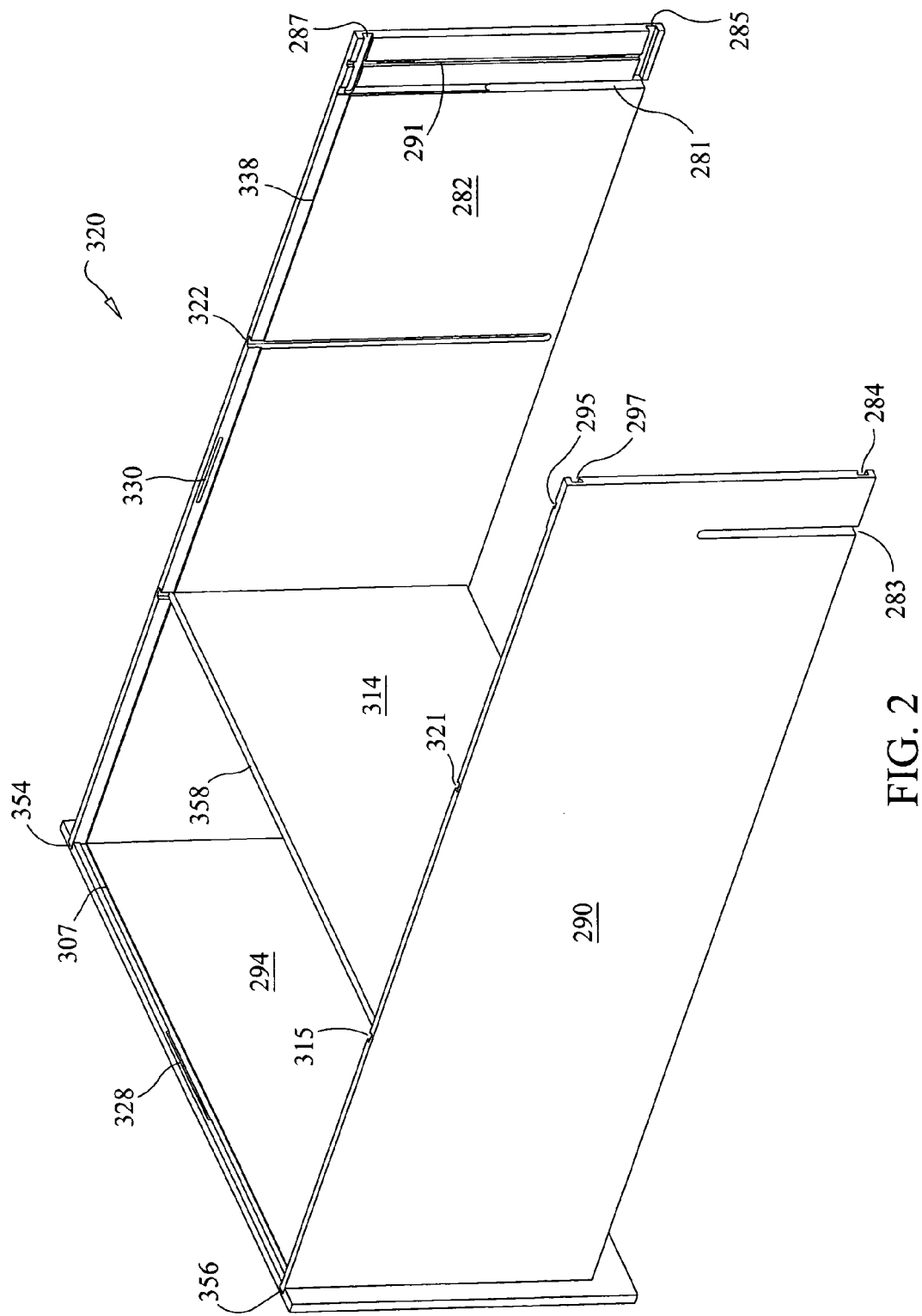
FIG. 2 is a perspective view of a preferred embodiment of the invention in a partially assembled state, lying on its front side.
Figure 3:
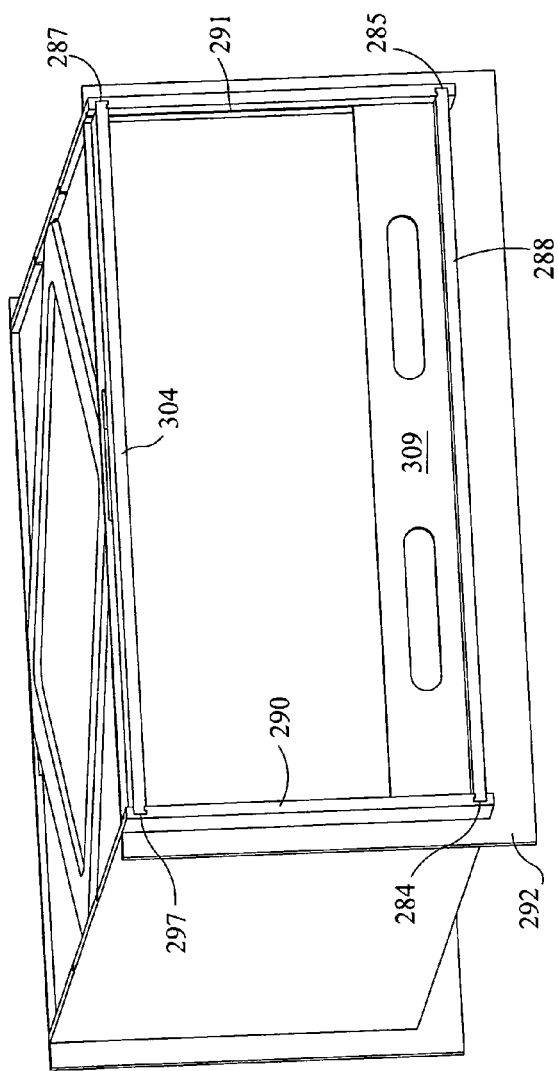
FIG. 3 is a bottom perspective view of a preferred embodiment of the invention in a partially assembled state.

Bottom plate 292 has bottom plate ledge 341, bottom plate topside radial slot 326 and two bottom plate slots 293 and 299 that extend part of the way through bottom plate 292. As illustrated in FIG. 2, left side 282 has left side cutout 281, first front vertical groove 285, first horizontal groove 291, left side ledge 340 and left side radial slot 330. As illustrated in FIGS. 1-3, right side 290 has right side cutout 283, second front vertical groove 284, second horizontal groove 295, right side ledge 340 and right side radial slot 332. Top plate 294 has top plate ledge 307, top plate underside radial slot 328 and two lower mortises that are slidably mountable (e.g., flange jointed) with left upper tenon 350 of left side 282 and right upper tenon 352 of right side 290.

Figure 4:
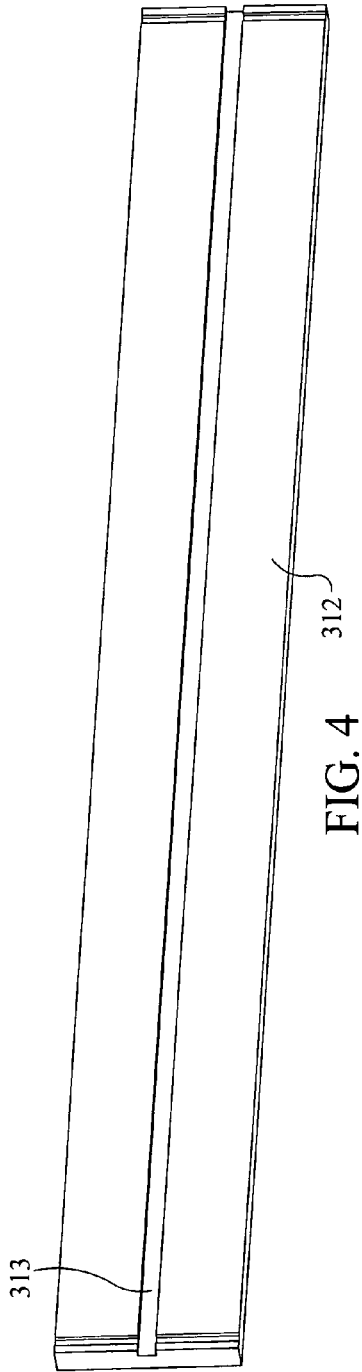
FIG. 4 is a perspective view of the back toe kick of a preferred embodiment of the invention.

Referring to FIG. 4, front toe kick 288 has third horizontal groove 289, front toe kick 288 being slidably mountable in first front vertical groove 285 and second front vertical groove 284. Toe brace front piece 309 is slidably mountable in first horizontal groove 291 of left side 282, second horizontal groove 295 of right side 290 and third horizontal groove 289 of front toe kick 288.

Figure 5:
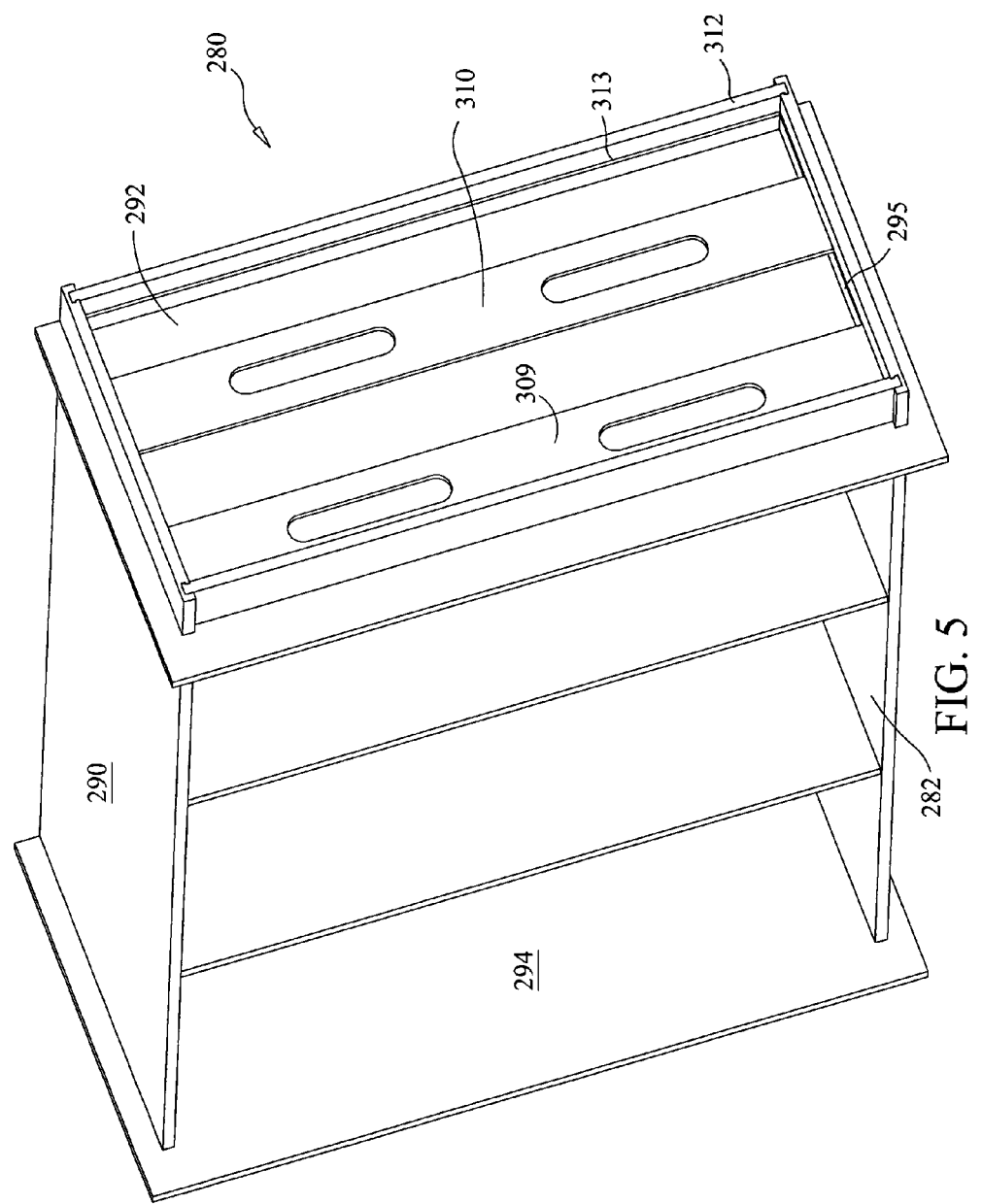
FIG. 5 is a partial bottom perspective view of the bookshelf of a preferred embodiment of the invention before the back toe kick has been locked in place.

Referring to FIG. 5, a preferred embodiment of front toe kick 312 is presented. In this embodiment, front toe kick has horizontal track 313 with which toe brace back piece 310 is slidably mountable. Toe brace back piece 310 is also slidably mountable in first horizontal groove 291 of left side 282 and second horizontal groove 295 of right side 290. Initially, toe brace back piece 310 is located substantially in the middle of these grooves 291 and 295, as shown here, and then it is moved to the back of these grooves and engaged with horizontal track 313.

Figure 6:
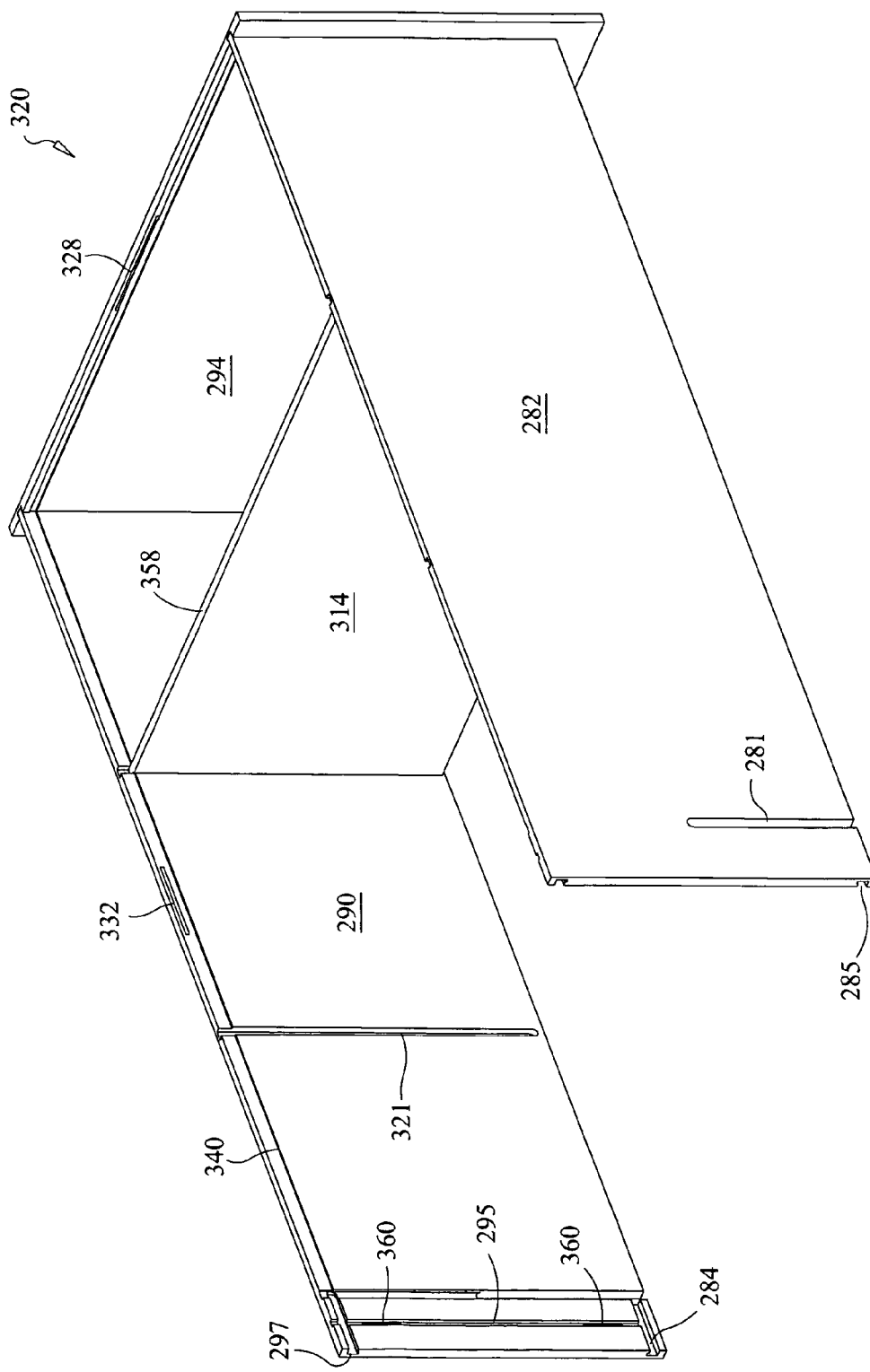
FIG. 6 is another perspective view of a preferred embodiment of the invention in a partially assembled state, lying on its front side.
Figure 7:
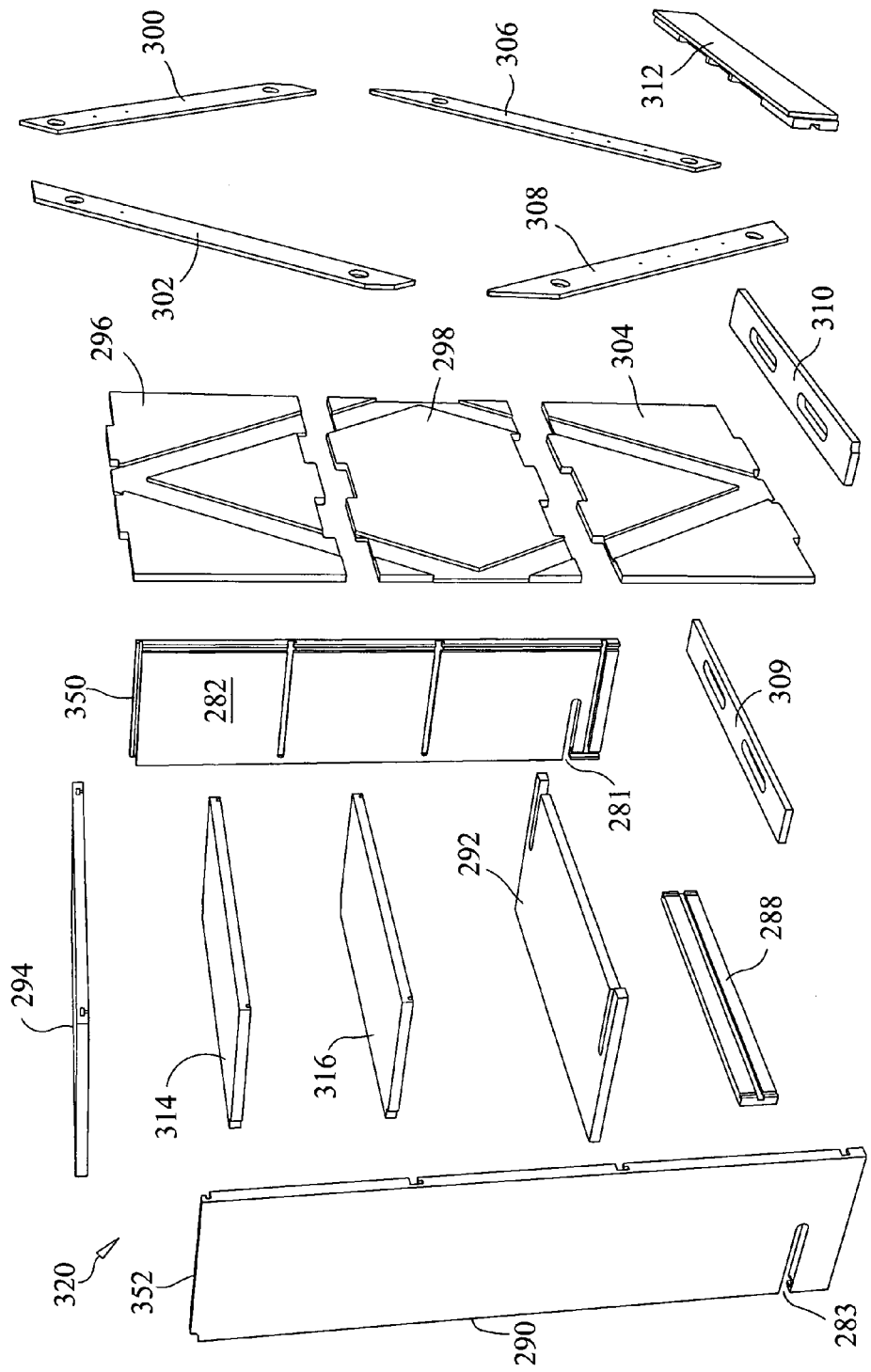
FIG. 7 is an exploded view of another preferred embodiment of a bookcase that incorporates aspects of the invention.

Referring to FIG. 6, the details of a preferred embodiment of right side 290 are presented, including right side radial slot 332 and right side ledge 340. In this embodiment, a plurality of divots 360 (preferably two) are provided in the back surface of (recessed into) left horizontal groove 291 and right horizontal groove 295. Divots 3860 hold a bendable plastic edge that is preferably attached to each end of each brace (toe brace front piece 309 and toe brace back piece 310) and that is slid into left horizontal groove 291 and right horizontal groove 295.

Quadrilateral 280 is preferably supplied in kit form and assembled where it is to be used. A person skilled in the art would realize that the assembly steps described below can be varied in the order in which they are performed. An initial step preferably involves sliding left side upper tenon 350 of left side 282 into said left side lower mortis 354 of top plate 294 and simultaneously sliding bottom plate 292 into left side cutout 281. Another step involves sliding right side upper tenon 352 of right side 290 into right side lower mortise 356 of top plate 294 and simultaneously sliding bottom plate 292 into right side cutout 283.

With the sides of frame 280 joined to top plate 294, the next step involves sliding front toe kick 288 into first front vertical groove 285 of left side 282 and into second front vertical groove 284 of right side 290. Another step involves sliding toe brace front piece 309 into first horizontal groove 291 and into second horizontal groove 295 until it seats in third horizontal groove 289. The next step involves sliding toe brace back piece 310 into first horizontal groove 291 and into second horizontal groove 295. The next step involves sliding back toe kick 312 into first back vertical groove 287 of left side 282 and into second back vertical groove 297 of right side 290. Finally, assembly of the frame is completed by sliding toe brace back piece 310 back until it locks into back toe kick 312. A person having skill in the art would realize that the above described steps could be performed in other orders and accomplish the same result.

With frame 280 assembled, at least one shelf is preferably installed by sliding first shelf 314 into left first shelf mounting groove 311 and into right first shelf mounting groove 315. Then, backing piece 319 on is placed on top plate ledge 341, left side ledge 338, right side ledge 340, first shelf back side 358 and bottom plate ledge 341. Backing piece 319 preferably has a first shelving groove into which first shelf back side fits. Finally, rotational diamond component 340 is placed on backing piece 319 and rotated about 45 degrees so that its tips engage with bottom plate topside radial slot 328, top plate underside radial slot 326, left side radial slot 330 and right side radial slot 332. In a preferred embodiment, the forward edges of the tips of rotational diamond component 342 are shaped so as to catch in interior divots in the back surfaces bottom plate topside radial slot 328, top plate underside radial slot 326, left side radial slot 330 and right side radial slot 332. For example, FIG. 6 shows a divot in the back surface of right side radial slot 332

In another preferred embodiment, quadrilateral 280 includes more than one shelf. In an embodiment having two shelves, the method further involve sliding second shelf 293 into left second shelf mounting groove 322 and right second shelf mounting groove 321 before resting said backing piece on said ledges.

Referring to FIGS. 7-11, another preferred embodiment of a bookcase that incorporates aspects of the invention is presented. In this embodiment, the invention is a quadrilateral (four-sided object) that is capable of resisting lateral forces. Quadrilateral or frame 280 comprises left side 282; front toe kick 288; toe brace front piece 309; right side 290; bottom plate 292; top plate 294; upper backing piece 296; middle backing piece 298; top left bracing piece 300; top right bracing piece 302; lower backing piece 304; bottom left bracing piece 306; bottom right bracing piece 308; toe brace back piece 310; and back toe kick 312.

Figure 8:
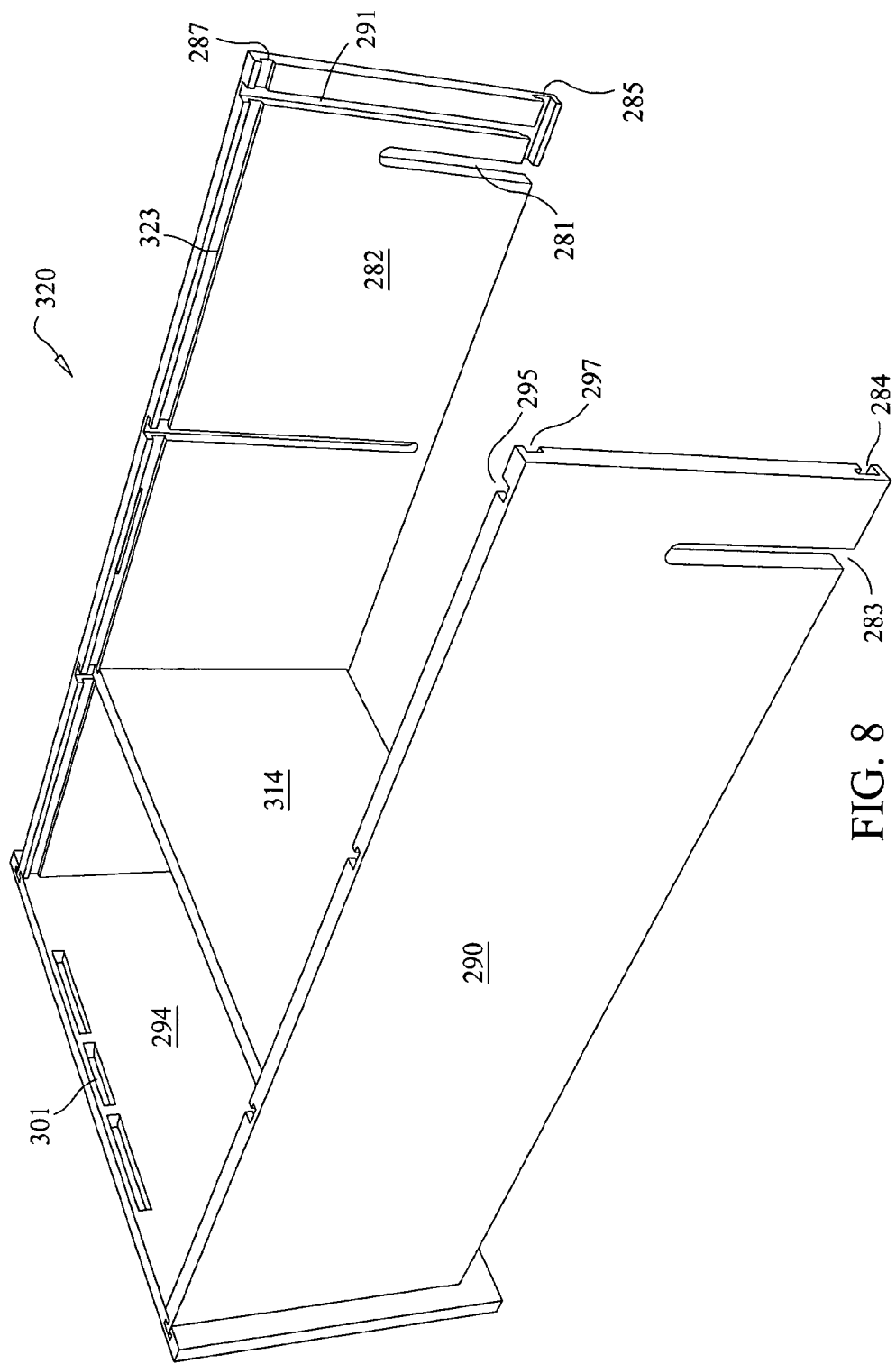
FIG. 8 is a perspective view of a preferred embodiment of the invention in a partially assembled state, lying on its front side.

Bottom plate 292 has two bottom plate slots 293 and 299 that extend part of the way through the plate and a longitudinal groove (not shown) in it lower surface adjacent to its front edge. As illustrated in FIG. 8, left side 282 has left side cutout 281, first front vertical groove 285 and first horizontal groove 291. Right side 290 has right side cutout 283, a second front vertical groove and second horizontal groove 295. Top plate 294 has underside indents 301 adjacent to its rear edge and two lower mortises 354 and 356 that are slidably mountable (e.g., flange jointed) with the left upper tenon of left side 282 and the right upper tenon of right side 290.

Figure 9:
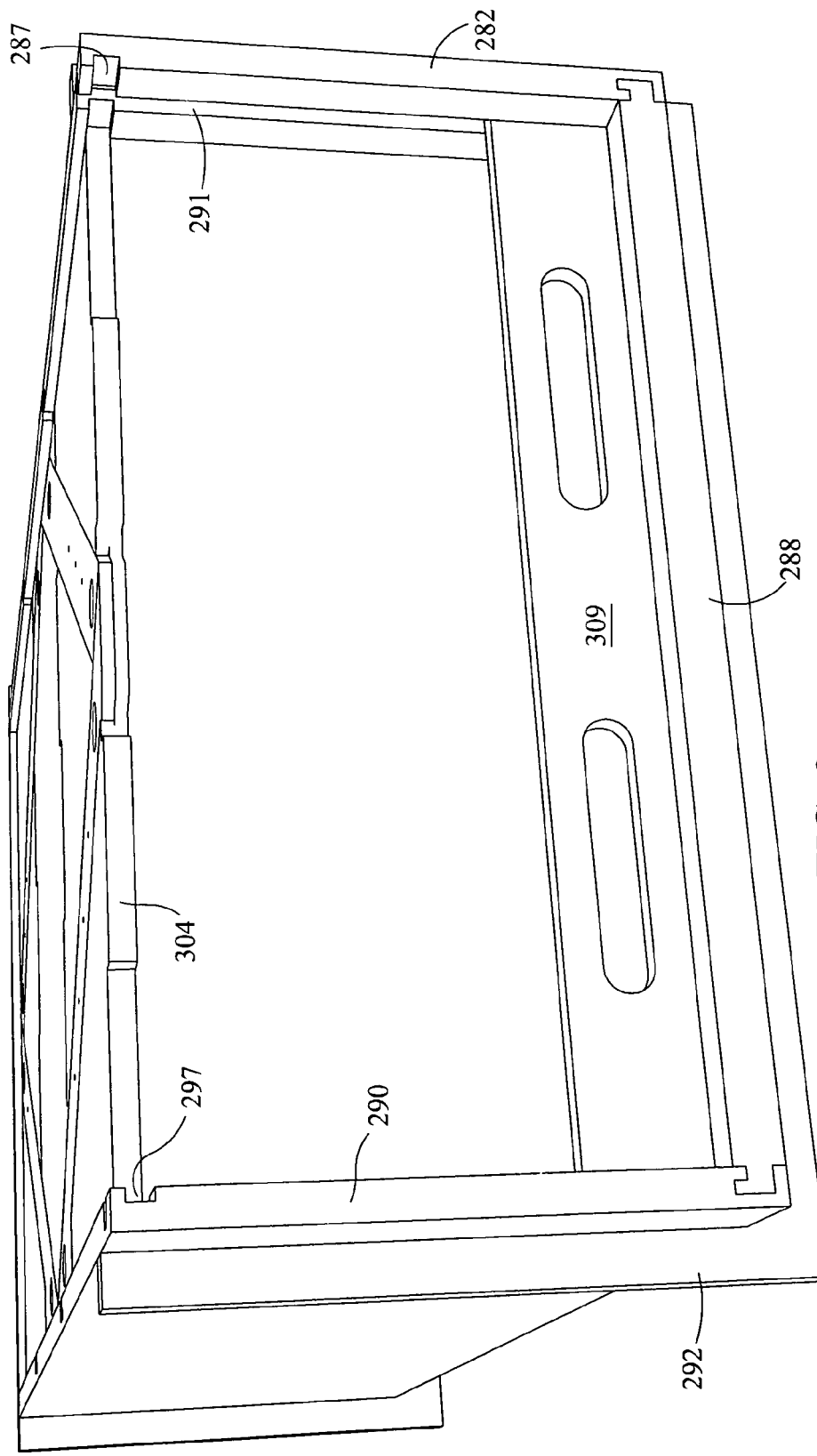
FIG. 9 is a bottom perspective view of a preferred embodiment of the invention in a partially assembled state.

Referring to FIG. 9, front toe kick 288 has third horizontal groove 289, front toe kick 288 being slidably mountable in first front vertical groove 285 of left side 282 (e.g. forming a first flush joint) and in second front vertical groove 295 of right side 290 (e.g., forming a second flush joint). Toe brace front piece 309 is slidably mountable in first horizontal groove 291 of left side 282, second horizontal groove 295 of right side 290 and third horizontal groove 289 of front toe kick 288.

Upper backing piece 296 has a first pair of backside tracks, upper backing piece 296 being slidably mountable in left track 323 of left side 282, a right track (not shown) of right side 290 and underside indents 301 of top plate 294. Middle backing piece 298 has a second pair of backside tracks, middle backing piece 298 being slidably mountable in left track 323 and said right track and being interlockable with upper backing piece 296. Top left bracing piece 300 is slidably mountable in one of said first pair of backside tracks and in one of said second pair of backside tracks before backing pieces 296 and 298 are fully installed. Similarly, top right bracing piece 308 is slidably mountable in the other of said first pair of backside tracks and in the other of said second pair of backside tracks before backing pieces 296 and 298 are fully installed. Lower backing piece 304 has a third pair of backside tracks, said lower backing piece being slidably mountable in said left track and said right track and being interlocked with middle backing piece 298. Bottom left bracing piece 306 is slidably mountable in one of said second pair of backside tracks and in one of said third pair of backside tracks. Bottom right bracing piece 308 is slidably mountable in the other of said second pair of backside tracks and in the other of said third pair of backside tracks.

Figure 10:
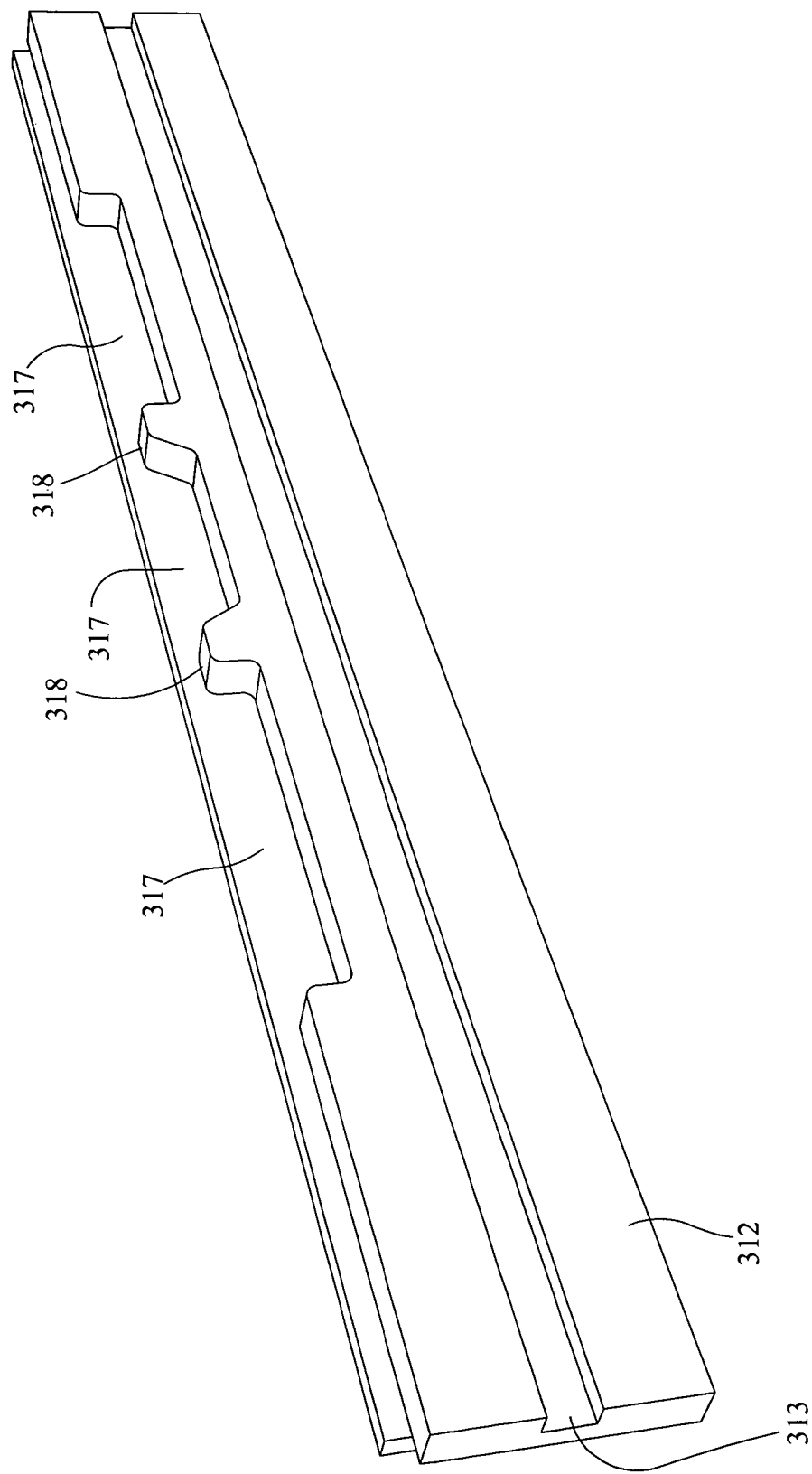
FIG. 10 is a perspective view of the back toe kick of a preferred embodiment of the invention.

Referring to FIG. 10, back toe kick 312 has horizontal track 313 and is slidably mountable in first back vertical groove 287 of left side 282 and in second back vertical groove 297 of right side 290. Back toe kick 312 is interlockable with toe brace back piece 310, lower backing piece 304, bottom left bracing piece 306 and bottom right bracing piece 308 by means of indents 317 and protrusions 318.

Figure 11:
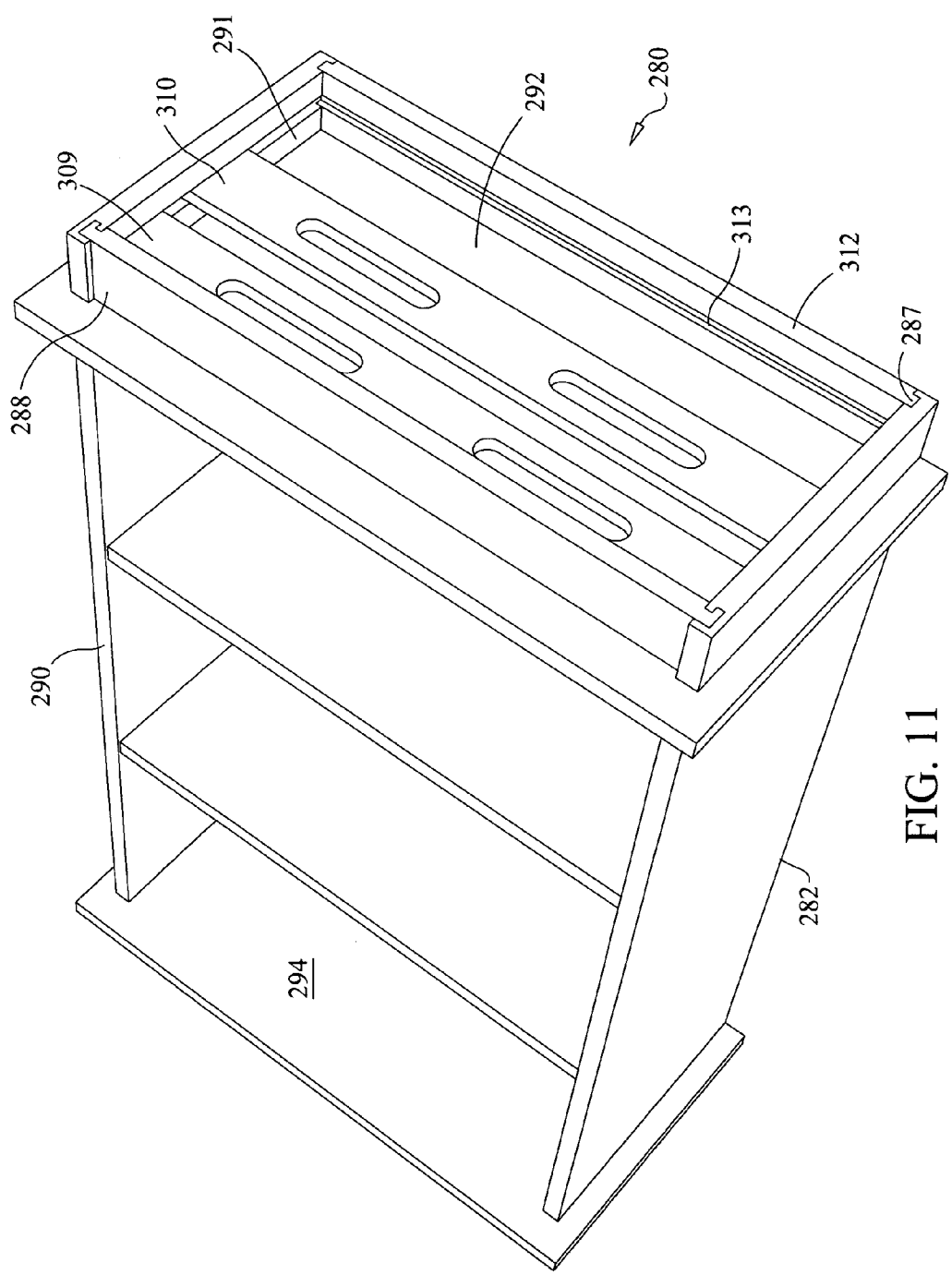
FIG. 11 is a partial bottom perspective view of the bookshelf of a preferred embodiment of the invention before the back toe kick has been locked in place.

Referring to FIG. 11, toe brace back piece 310 is slidably mountable first horizontal groove 291 of left side 282 and second horizontal groove 295 of right side 290. Initially, toe brace back piece 310 is located substantially in the middle of these grooves, as shown here, and then it is moved to the back of these grooves and engaged with horizontal track 313.

Quadrilateral 280 is preferably supplied in kit form and assembled where it is to be used. An initial step involves sliding top plate 294 back into the upper tenons of right side 290 and left side 282 until it can move back no further as shown in FIG. 9. The next step involves sliding bottom plate 292 into left side cutout 281 and right side cutout 283. The next step involves sliding first shelf 314 and second shelf 316 into their respective grooves located on the inside surface of right side 290 and left side 282.

With the frame assembled, the next step involves sliding upper backing piece 296 and middle backing piece 298 into the tracks located at the back of right side 290 and left side 282, starting from the back bottom of the bookshelf, and pausing in sliding them up when middle backing piece 298 is about halfway inserted. With middle backing section 298 now extending about halfway out of the tracks, the next step involves sliding the top two bracing pieces, 300 and 302, into the respective tracks located on the back side of the backing pieces 296 and 298. Then, the next step involves sliding this four element assembly up until it locks into indents 301 located on the underside of top plate 294. The next step involves sliding the remaining backing piece, 304 up into left rack 323 and the right track (not shown) until it locks with middle backing piece 298. Then, the next step involves sliding the remaining two bracing pieces, 306 and 308, into the respective tracks located on the backside of the bottom backing piece 304.

The next step involves sliding toe brace front piece 309 into first horizontal groove 291 and second horizontal groove 295. The next step involves sliding toe brace back piece 310 until it is in the middle of first horizontal groove 291 and second horizontal groove 295 as shown in FIG. 11. The next step involves sliding back toe kick 312 up into the back vertical grooves 287 and 297 located adjacent to the back edges of left side 282 and right side 290 until it locks into backing piece 304 and bracing pieces 306 and 308 located at the bottom back area of the bookshelf. The final step involves sliding toe brace back piece 310 back until it locks into back toe kick 312.

In a preferred embodiment, bookshelf 280 is constructed of materials having a density that is high enough that it can hold the complex edge conditions that will be expected from it, not only during the manufacturing process but over time, as well when the unit is being assembled and disassembled. Preferred materials include black paper phenolic.

In another preferred embodiment, quadrilateral 280 comprises basic frame 320 (comprising right side 290, left side 282, top plate 294 and bottom plate 292); upper backing piece 296; middle backing piece 298; top left bracing piece 300; top right bracing piece 302; lower backing piece 304; bottom left bracing piece 306; and bottom right bracing piece 308. Basic frame 320 has left track 323, a right track (not shown) and underside indents 301. Upper backing piece 296 has a first pair of backside tracks and is slidably mountable in the left track, the right track and the underside indents. Middle backing piece 298 has a second pair of backside tracks and is slidably mountable in the left track and the right track and is interlocked with upper backing piece 296. Top left bracing piece 300 is slidably mountable in one of the first pair of backside tracks and in one of the second pair of backside tracks. Top right bracing piece 302 is slidably mountable in the other of the first pair of backside tracks and in the other of the second pair of backside tracks. Lower backing piece 304 has a third pair of backside tracks, lower backing piece 304 being slidably mountable in said left track and said right track and being interlocked with middle backing piece 298. Bottom left bracing piece 306 is slidably mountable in one of the second pair of backside tracks and in one of the third pair of backside tracks. Bottom right bracing piece 308 is slidably mountable in the other of the second pair of backside tracks and in the other of the third pair of backside tracks.

Figure 12:
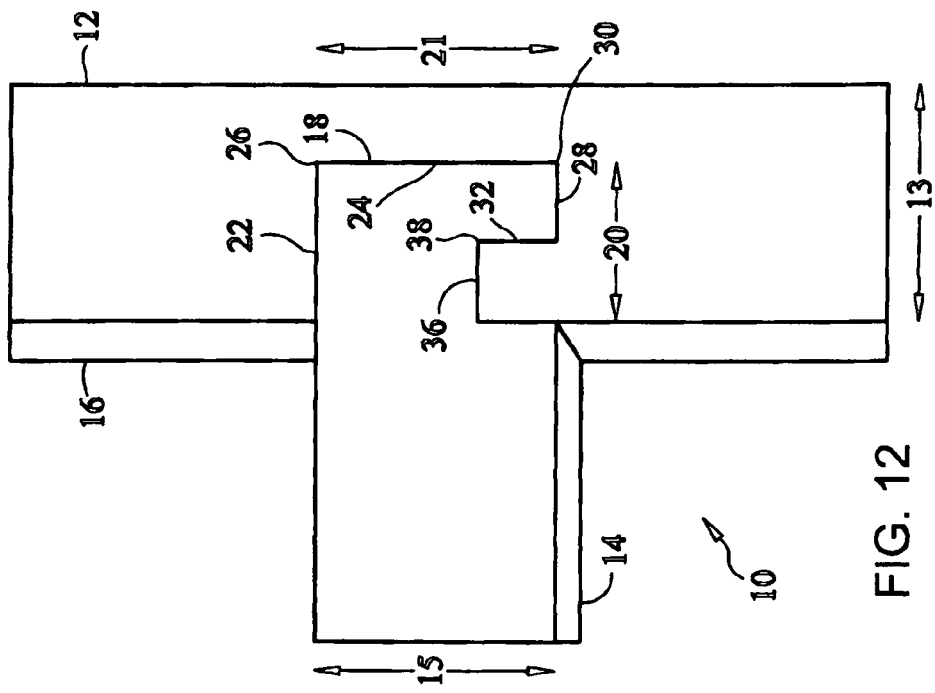
FIG. 12 is a perspective view of the mortise portion of a preferred embodiment of the shelf joint system of the present invention, shown assembled with the tenon portion for clarity.

Referring to FIG. 12, a preferred embodiment of shelf joint system 10 of the present invention is presented. While this drawing presents a front view of the right end of first shelf 314 or second shelf 316, the left end of the shelf would be a mirror image. In this drawing, the elements of mortise 18 (first asymmetrical mortise or second asymmetrical mortise) are called out. In this embodiment, the invention is an interlocking joint system for joining members, preferably at right angles to one another. While this embodiment envisions joining a shelf to a support, joint system 10 can be used to join any two members. Shelf joint system 10 preferably comprises support member 12 (e.g., left side 282 or right side 290) and shelf member 14 (e.g., first shelf 314 or second shelf 316). Support member 12 preferably comprises support outer surface 16 into which mortise 18 having full depth 20 is formed. Mortise 18 is preferably bounded by first mortise-forming surface 22 that is substantially perpendicular to support outer surface 16 and that extends a distance from support outer surface 16 to the full depth 20 of mortise 18. This distance is preferably equal to about two thirds of support member thickness 13. Mortise 18 is preferably also bounded by second mortise-forming surface 24 that is substantially parallel to support outer surface 16 at full depth 20 of mortise 18. First mortise-forming surface 22 and second mortise-forming surface 24 preferably intersect at first mortise corner 26. Mortise 18 is preferably also bounded by third mortise-forming surface 28 that is substantially perpendicular to support outer surface 16 and extends from second mortise-forming surface 24 toward support outer surface 16 but does not reach support outer surface 16. Second mortise-forming surface 24 and third mortise-forming surface 28 preferably intersect in second mortise corner 30. Mortise 20 is preferably also bounded by fourth mortise-forming surface 32 that is substantially parallel to support outer surface 16 and extends a distance toward first mortise-forming surface 22 but does not reach first mortise surface 22. This distance is preferably equal to about one third of shelf member thickness 15. Third mortise-forming surface 28 and fourth mortise-forming surface 32 preferably intersect in third mortise corner 34. Mortise 18 is preferably also bounded by fifth mortise-forming surface 36 that is substantially perpendicular to support outer surface 16 and extends to support outer surface 16. Fourth mortise-forming surface 32 and fifth mortise-forming surface 36 preferably intersect in fourth mortise corner 38. In a preferred embodiment, the mortise corners are square, but in an alternative embodiment they are rounded.

Figure 13:
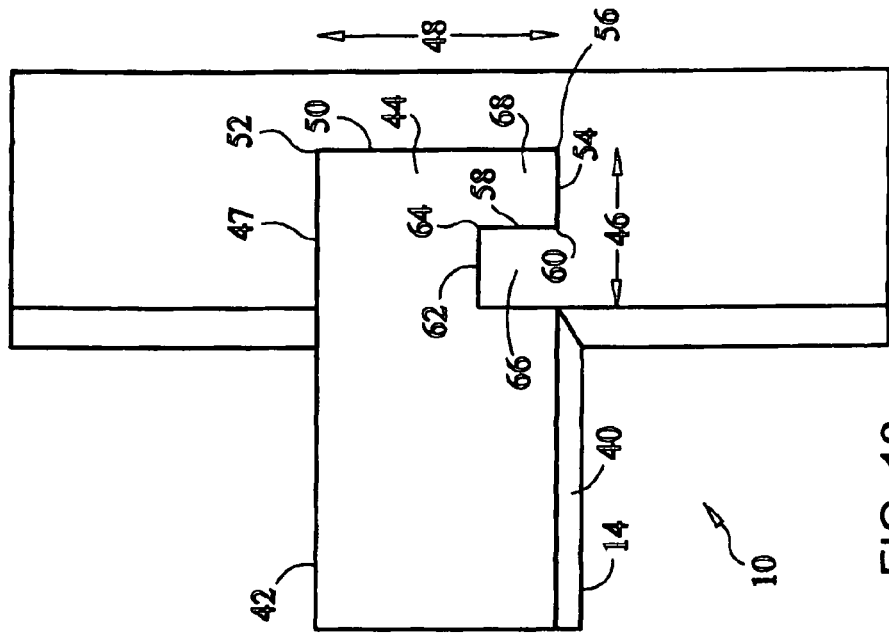
FIG. 13 is a perspective view of the tenon portion of a preferred embodiment of the shelf joint system of the present invention, shown assembled with the mortise portion for clarity.

Referring to FIG. 13, shelf member 14 preferably comprises two substantially parallel outer surfaces 40 and 42 and tenon 44 that is preferably configured to fit (preferably tightly) into mortise 18. In this drawing, the elements of tenon 44 are called out. Tenon 44 has full depth 46 and full width 48. Tenon 44 is preferably bounded by first tenon surface 47 that is in the same plane as second outer surface 42 and extends to full depth 46. Tenon 44 is preferably also bounded by second tenon surface 50 that is substantially perpendicular to first tenon surface 47 and extends to full width 48. First tenon surface 47 and second tenon surface 50 preferably intersect at first tenon corner 52. Tenon 44 is preferably also bounded by third tenon surface 54 that is in the same plane as the first shelf outer surface 40 and extends from second tenon surface 50 a distance that is less than full depth 46. Preferably, this distance is about one half of full depth 46 and about one third of support member thickness 13. Second tenon surface 50 and third tenon surface 54 preferably intersect at second tenon corner 56. Tenon 44 is preferably also bounded by fourth tenon surface 58 that is substantially perpendicular to the shelf outer surfaces and that extends toward first tenon surface 47 less than full width 48. Third tenon surface 54 and fourth tenon surface 58 preferably intersect at third tenon corner 60. Tenon 44 is preferably also bounded by fifth tenon surface 62 that extends from fourth tenon surface 58 substantially parallel to surfaces 42 and 54. Fourth tenon surface 58 and fifth tenon surface 62 preferably intersect at fourth tenon corner 64.

Referring to FIGS. 12 and 13, yet another preferred embodiment of shelf joint system 10 comprises support member 12 having mortise 18 and tenon 44. Mortise 18 is formed in support member 12 by passing a T-slot cutter through support member 12 to produce a T-shaped slot having overhanging edges. Then straight-slot cutter is passed through support member 12 to remove one overhanging edge and leave other overhanging edge 66. Tenon 44 is formed by passing a straight-slot cutter through shelf member 12 to produce interlocking member 44 shaped so as to slide (preferably tightly) into mortise 18.

Referring to FIGS. 12 and 13, a further preferred embodiment of shelf joint system 10 comprises support member 12 having asymmetrical mortise 18 and shelf member 12 having asymmetric tenon 44. Asymmetrical mortise 12 is formed by first cantilever 66 (e.g., right cantilever or left cantilever) that is a portion of support member 12 (e.g., right side 290 or left side 282). Asymmetrical tenon 44 is formed by second cantilever 68 (e.g., a shelf cantilever) that is a part of shelf member 12 (e.g., first shelf 314 or second shelf 316).

Referring to FIG. 14, a preferred embodiment of flange joint system 80 of the present invention is presented. In this drawing, the elements of flange mortise 88 are called out. In this embodiment, the invention is an interlocking joint system for joining members, preferably at right angles to one another. While this embodiment envisions joining a flange to a vertical member, joint system 80 can be used to join any two members. Flange joint system 80 preferably comprises vertical member 82 and flange member 84. Flange member 84 preferably comprises flange outer surface 86 into which flange mortise 88 having full flange mortise depth 90 and full flange mortise width 92 is formed. Flange mortise 88 is preferably bounded by first flange mortise-forming surface 94 that is substantially perpendicular to flange outer surface 86 and extends from flange outer surface 86 a distance that is less than full flange mortise depth 90. Preferably, this distance is about one half of full flange mortise depth 90 and about one third of flange member thickness 85. Flange mortise 88 is preferably also bounded by second flange mortise-forming surface 96 that is substantially parallel to flange outer surface 86 and extends a distance that is less than full flange mortise depth 90. Preferably, this distance is about one third of full flange mortise width 92 and about one third of vertical member thickness 83. First flange mortise-forming surface 94 and second flange mortise-forming surface 96 preferably intersect at first flange mortise corner 98. Flange mortise 88 is preferably also bounded by third flange mortise-forming surface 100 that is substantially perpendicular to said outer flange surface 86 and that extends from second flange mortise-forming surface 96 to full flange mortise depth 90. Preferably, third flange mortise-forming surface 100 extends a distance that is about one third of flange member thickness 85. Second flange mortise-forming surface 96 and third flange mortise-forming surface 100 preferably intersect in second flange mortise corner 102. Flange mortise 88 is preferably also bounded by fourth flange mortise-forming surface 104 that is substantially parallel to flange outer surface 86 and extends across full flange mortise width 92 at full flange mortise depth 90. Third flange mortise-forming surface 100 and fourth flange mortise-forming surface 104 preferably intersect in third flange mortise corner 103. Flange mortise 88 is preferably also bounded by fifth flange mortise-forming surface 106 that is substantially perpendicular to flange outer surface 86 and that extends toward flange outer surface 86 but does not reach it. Preferably, fifth flange mortise-forming surface 106 extends a distance that is about one third of flange member thickness 85. Fourth flange mortise-forming surface 104 and fifth flange mortise-forming surface 106 preferably intersect in fourth mortise corner 108. Flange mortise 88 is preferably also bounded by sixth flange mortise-forming surface 110 that is substantially parallel to flange outer surface 88 at less than full flange mortise depth 90. Fifth flange mortise-forming surface 106 and sixth flange mortise-forming surface 110 preferably intersect at fifth mortise corner 112. Flange mortise 88 is preferably also bounded by seventh flange mortise-forming surface 114 that is substantially perpendicular to outer flange surface 86 and that extends from sixth flange mortise-forming surface 110 to outer flange surface 86. Sixth flange mortise-forming surface 110 and seventh flange mortise-forming surface 114 preferably intersect at sixth mortise corner 116.

Referring to FIG. 15, vertical member 82 preferably comprises two substantially parallel outer surfaces 100 and 122 and vertical tenon 124 that is configured to fit (preferably tightly) into flange mortise 88 but not to fill flange mortise 88. In this drawing, the elements of vertical tenon 124 are called out. Vertical tenon 124 is preferably bounded by first vertical tenon surface 126 that is in the same plane as first vertical support outer surface 120 and that extends full vertical tenon depth 128. Full tenon depth 128 is preferably about two thirds of flange member thickness 85. Vertical tenon 124 is preferably also bounded by second vertical tenon surface 130 that is substantially perpendicular to said first vertical tenon surface 126 and that extends a distance is approximately equal to full vertical tenon width 132, which width is preferably approximately equal to two thirds of vertical member thickness 83. First vertical tenon surface 126 and second vertical tenon surface 130 preferably intersect at first vertical tenon corner 136. Vertical tenon 124 is preferably also bounded by third vertical tenon surface 138 that is substantially parallel to the vertical support outer surfaces and that extends from second vertical tenon surface 130 a distance that is less than full vertical tenon depth 128. Preferably, this distance is about one third of flange member thickness 85. Second vertical tenon surface 130 and third vertical tenon surface 138 preferably intersect at second vertical tenon corner 140. Vertical tenon 124 is preferably also bounded by fourth vertical tenon surface 142 that is substantially perpendicular to the vertical support outer surfaces and that extends a distance toward first vertical tenon surface 126 that is less than full vertical tenon width 132. Preferably, this distance is about one half of full vertical tenon width 132 and one third of vertical member thickness 83. Third vertical tenon surface 138 and fourth vertical tenon surface 142 preferably intersect at third vertical tenon corner 144. Vertical tenon 126 is preferably also bounded by fifth vertical tenon surface 146 that extends from fourth vertical tenon surface 142 substantially parallel to the vertical support outer surfaces. Fourth vertical tenon surface 142 and fifth vertical tenon surface 146 preferably intersect at fourth vertical tenon corner 148.

Referring to FIGS. 14 and 15, yet another preferred embodiment of flange joint system 80 comprises flange member 84 having flange mortise 88 formed therein and vertical tenon 124. Flange mortise 88 is preferably formed by passing a T-slot cutter through flange member 82 to produce a T-shaped slot having two overhanging edges. Vertical tenon 124 is formed by passing a straight-slot cutter or one arm of a T-slot cutter through vertical member 82 to produce an interlocking member shaped so as to be slidable (preferably tightly slidable) into a portion of flange mortise 88.

Referring to FIGS. 14 and 15, a further preferred embodiment of flange joint system 80 comprises flange member 84 having asymmetrical flange mortise 88 and vertical tenon 124. Asymmetrical flange mortise 88 is formed by first flange mortise cantilever 150 and second flange mortise cantilever 152 that are portions of flange member 84. Vertical member 84 comprises asymmetrical vertical tenon 124 which is formed by vertical tenon cantilever 154 that is a part of vertical support 84.

A person skilled in the art would understand that the joint systems and furniture components disclosed herein may be used in different combinations from the preferred embodiments illustrated herein. For example, the applicant has envisioned a dresser (chest of drawers) in which the main rectangular frame incorporates the diamond back bracing system disclosed herein and the drawers incorporate the two rotational lockdown components. Multiple rotational lockdown components could be incorporated into many of the structures disclosed herein. Many other combinations are possible.

Many variations of the invention will occur to those skilled in the art. Some variations include providing components having shapes similar to those illustrated herein. Other variations call for providing components that are functionally equivalent to those illustrated herein. All such variations are intended to be within the scope and spirit of the invention.

Although some embodiments are shown to include certain features, the applicant specifically contemplates that any feature disclosed herein may be used together or in combination with any other feature on any embodiment of the invention. It is also contemplated that any feature may be specifically excluded from any embodiment of the invention.

What is claimed is:

1. A furniture system comprising:
   a top plate having two lower mortises;
   a left side having a left upper tenon that is slidably engageable with one of said two upper mortises, a left cutout, a left ledge and a left side radial slot;
   a right side having a right upper tenon that is slidably engageable with the other of said two upper mortises, a right cutout, a right ledge and a right side radial slot;
   a bottom plate having a left slot that is slideably engageable with said left cutout and a right slot that is slidably engageable with said right cutout;
   a backing piece that is adapted to be rested on said left ledge and on said right ledge; and
   a rotational diamond component that comprises tips that are rotatably engageable with said left side radial slot and with said right side radial slot.

2. The furniture system of claim 1 wherein:
   said left side has a left side first shelf mounting groove that is L-shaped in cross section and said right side has a right side first shelf mounting groove that is L-shaped in cross section; and
   said furniture system further comprises:
      a first shelve having ends that are slidably engagable with said left side first shelf mounting groove and with said right side first shelf mounting groove.

3. The furniture system of claim 1 wherein:
said left side has a first front vertical groove, a left back vertical groove and a left horizontal groove;
said right side has a second front vertical groove, a right back vertical groove and a right horizontal groove; and
said furniture system further comprises:
   a front toe kick that is slidably engageable with said first front vertical groove and with said second front vertical groove, said front toe kick having a third horizontal groove;
   a back toe kick that is slidably engageable with said left back vertical groove and with said right back vertical groove, said back toe kick having a horizontal track;
   a toe brace front piece that is slidably engageable with said left horizontal groove, with said right horizontal groove and with said third horizontal groove; and
   a toe brace back piece that is slidably engageable with said left horizontal groove, with said right horizontal groove and with said horizontal track.

4. The furniture system of claim 1 wherein:
said top plate has a top plate underside radial slot;
said bottom plate has a bottom plate topside radial slot; and
said tips of the rotational diamond component are rotatably engageable with said top plate underside radial slot and with said bottom plate topside radial slot radial slot.

5. A furniture system, said furniture system comprising:
a top plate having a top plate underside radial slot, a top plate ledge and two lower mortises;
a bottom plate having two bottom plate slots that extend part of the way through said bottom plate, a bottom plate topside radial slot and a bottom plate ledge;
a left side having a first front vertical groove, a left plate ledge, a left first shelf mounting groove, a left upper tenon that is slidably mountable in one of said two lower mortises, a first horizontal groove, a left back vertical groove and a left side radial slot;
a right side having a second front vertical groove, a right plate ledge, a right first shelf mounting groove and a right upper tenon that is slidably mountable in the other of said two lower mortises, a second horizontal groove, a right back vertical groove and a right side radial slot;
a front toe kick having a third horizontal groove, said front toe kick being slidably mountable in said first front vertical groove and in said second front vertical groove;
a toe brace front piece that is slidably mountable in said first horizontal groove, in said second horizontal groove and in said third horizontal groove;
a toe brace back piece that is slidably mountable in said first horizontal groove and in said second horizontal groove;
a back toe kick having a horizontal track, said back toe kick being slidably mountable in said left back vertical groove and in said right back vertical groove and being interlockable with said toe brace back piece;
a first shelf that is slidably mountable in said left first shelf mounting groove and in said right first shelf mounting groove;
a backing piece that is mountable on said top plate ledge, on said left plate ledge, on said right plate ledge and on said bottom plate ledge; and
   a rotational diamond component that is mountable on said backing piece and that comprises tips that are adapted for rotational engagement with said top plate underside radial slot, said bottom plate topside radial slot, said left side radial slot and said right side radial slot.

6. The furniture system of claim 1 wherein each lower mortise and associated upper tenon comprise an interlocking flange joint system wherein each lower mortise is T-shaped in cross section and each upper tenon is L-shaped in cross section.

7. The furniture system of claim 1 wherein each left first shelf mounting groove is a first asymmetrical shelf mortise, said first asymmetrical shelf mortise being L-shaped in cross section and formed by a left cantilever that is a portion of said left side and each right first shelf mounting groove is a second asymmetrical shelf mortise, said second asymmetrical shelf mortise being L-shaped in cross section and formed by a right cantilever that is a part of said right side; and
   wherein each end of said shelf has an asymmetrical tenon, each said asymmetrical tenon being L-shaped in cross section and formed by a shelf cantilever.

8. A method for assembling a structure, said method comprising:
   obtaining a kit that includes the components of the structure of claim 1;
   sliding said left side upper tenon of said left side into one of said two lower mortises of said top plate and simultaneously sliding said bottom plate into said left side cutout;
   sliding said right side upper tenon of said right side into the other of said two lower mortises of said top plate and simultaneously sliding said bottom plate into said right side cutout;
   sliding said front toe kick into said first front vertical groove of said left side and into said second front vertical groove of said right side;
   sliding said toe brace front piece into said first horizontal groove and into said second horizontal groove until it seats in said third horizontal groove;
   sliding said toe brace back piece into said first horizontal groove and said second horizontal groove;
   sliding said back toe kick into said first back vertical groove of said left side and into said second back vertical groove of said right side;
   sliding said toe brace back piece back until it locks into said back toe kick;
   sliding said first shelf into said left first shelf mounting groove and into said right first shelf mounting groove;
   resting said backing piece on said top plate ledge, on said left side ledge, on said right side ledge, on said first shelf back side and on said bottom plate ledge; and
   placing said rotational diamond component on said backing piece and rotating said rotational diamond component about 45 degrees.

9. The method of claim 8 further comprising:
   sliding a second shelf into a left second shelf mounting groove and into a right second shelf mounting groove before resting said backing piece on said ledges.

* * * * *